(12) United States Patent
O'Rourke et al.

(10) Patent No.: US 6,280,656 B1
(45) Date of Patent: Aug. 28, 2001

(54) PHOSPHOR AND METHOD FOR THE FABRICATION THEREOF

(75) Inventors: Shawn O'Rourke, Chandler; Matthew Stainer, Phoenix; Peter A. Smith, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,800

(22) Filed: Feb. 8, 2000

(51) Int. Cl.$^7$ .................................................. C09K 11/02
(52) U.S. Cl. ........................... 252/301.4 F; 252/301.4 R; 252/301.6 R; 313/496; 428/404; 428/403
(58) Field of Search .................. 313/496; 252/301.4 R, 252/301.4 F, 301.6 R; 428/403, 404

(56) References Cited

U.S. PATENT DOCUMENTS

| | | | |
|---|---|---|---|
| 4,680,231 | * | 7/1987 | Yamaura et al. ............. 252/301.4 R |
| 5,366,834 | * | 11/1994 | Yoneda et al. ........................ 430/23 |
| 5,958,269 | * | 9/1999 | Do et al. ........................ 252/301.4 R |
| 6,010,779 | * | 1/2000 | Picht et al. ............................ 428/329 |
| 6,099,753 | * | 8/2000 | Yoshimura et al. .......... 252/301.4 R |

* cited by examiner

Primary Examiner—C. Melissa Koslow
(74) Attorney, Agent, or Firm—Kevin D. Wills; William E. Koch

(57) ABSTRACT

A phosphor includes about 99 dry weight % cathodoluminescent particles, which have a mean particle diameter equal to about 4 microns, and about 1 dry weight % non-cathodoluminescent inorganic particles, which have a mean particle diameter equal to about 20 microns.

A method for fabricating phosphor includes the steps of providing an aqueous polyvinyl alcohol solution having about 7.5 weight % polyvinyl alcohol, adding cathodoluminescent particles to the aqueous polyvinyl alcohol solution to provide a cathodoluminescent particle solution having about 16.5 volume % cathodoluminescent particles, and adding non-cathodoluminescent inorganic particles to the cathodoluminescent particle solution to provide a phosphor paste. Non-cathodoluminescent inorganic particles function as dispersants and suspension-stabilizing agents in the phosphor paste.

28 Claims, 1 Drawing Sheet

PHOSPHOR AND METHOD FOR THE FABRICATION THEREOF

FIELD OF THE INVENTION

The present invention pertains to the area of cathodoluminescent phosphors and, more particularly, to cathodoluminescent phosphors having reduced carbonaceous residues.

BACKGROUND OF THE INVENTION

Cathodoluminescent phosphors and methods for their fabrication are known in the art. They are employed in display devices, such as field emission displays, and are useful for forming the display image.

Prior art schemes for fabricating a phosphor within a display device include the step of forming a paste, which is applied to a substrate, such as by screen-printing. These pastes typically include a mixture of cathodoluminescent particles, organic dispersants, organic stabilizing agents, organic binders, inorganic binders, and a vehicle.

The organic dispersant is useful for controlling inter-particle forces within the phosphor paste. The inter-particle forces are controlled to provide a phosphor paste having favorable theological properties and favorable suspension stability. A low viscosity is preferred so that, for example, the thickness of the printed layer can be small. A thinner phosphor results in improved brightness when contrasted with a thicker phosphor. A lower viscosity also increases the upper limit of the particulate content, which defines a processable film.

The suspension stability refers to the tendency of the phosphor paste to maintain its suspension when it is allowed to sit. It is preferred that the phosphor paste have a high suspension stability so that the characteristics of the phosphor paste remain constant during the application process.

Such prior art schemes for fabricating phosphors, however, can result in undesirable effects when employed to fabricate field emission displays (FED's). First, the removal of organics from the printed phosphor paste requires combustion.

A typical substrate for an anode plate of a FED is made from soda lime glass, which has a temperature tolerance of about 500° C. While the burnout temperatures of typical organic binders and organic stabilizing agents are below the temperature tolerance of soda lime glass, the burnout temperatures of typical organic dispersants, such as ammonium polyacrylates, are above the temperature tolerance of soda lime glass.

Thus, although removal of organics from the printed phosphor paste can be achieved by combustion, typically the removal is incomplete, resulting in residual carbonaceous residues in the phosphor. These carbonaceous residues can be liberated into the evacuated envelope of the FED.

The performance of a FED is sensitive to the presence of organic species within the evacuated region of the device. For example, the emissive properties of the electron emitters are adversely affected by the accumulation of organics at the surfaces of the electron emitters.

Furthermore, carbonaceous residues are believed to cause problems when dielectric spacer structures are employed. The dielectric spacer structures are useful for maintaining the separation distance between the anode and cathode plates of the FED. It is believed that the presence of carbonaceous residues at the surfaces of the dielectric spacer structures can result in the failure of the spacer during the operation of the FED. Thus, the presence of carbonaceous residue in prior art phosphors can have deleterious effects on the performance of a FED.

Accordingly, there exists a need for an improved phosphor and method for the fabrication thereof, which reduce or eliminate the need for organics and, in particular, organic dispersants in the phosphor paste.

Figure 1:
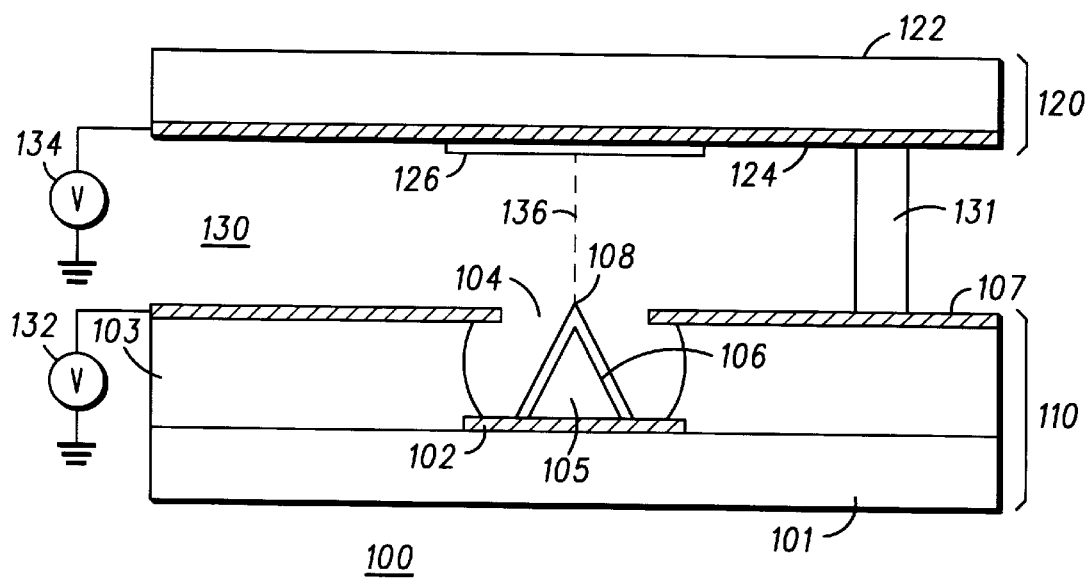
FIG. 1 is a cross-sectional view of a preferred embodiment of a field emission display, in accordance with the invention.

It will be appreciated that for simplicity and clarity of illustration, elements shown in the drawings have not necessarily been drawn to scale. For example, the dimensions of some of the elements are exaggerated relative to each other. Further, where considered appropriate, reference numerals have been repeated among the drawings to indicate corresponding elements.

DESCRIPTION OF THE PREFERRED EMBODIMENTS

The invention is for a phosphor having a mixture of cathodoluminescent particles and non-cathodoluminescent inorganic particles. The relative amounts of the cathodoluminescent particles and non-cathodoluminescent inorganic particles as well as the particle size of the non-cathodoluminescent inorganic particles are selected to promote de-agglomeration in a phosphor paste used to fabricate the phosphor.

The invention is further for a field emission display, which includes the improved phosphor. A field emission display in accordance with the invention exhibits an improved luminous efficiency and an improved uniformity of light output over the faceplate, when contrasted with a prior art field emission display in which an organic dispersant is employed to fabricate the phosphor.

The method of the invention for fabricating a phosphor does not require a high temperature combustion step to remove organic dispersants. The method of the invention includes the step of providing non-cathodoluminescent inorganic particles in a phosphor paste. The particle size and concentration of the non-cathodoluminescent inorganic particles are selected to promote de-agglomeration within the phosphor paste. The method of the invention further does not require a step for removing the dispersant. Rather, the non-cathodoluminescent inorganic particles become part of the phosphor and can be useful for providing additional benefits, such as gettering, enhanced electrical conductivity, and light scattering.

FIG. 1 is a cross-sectional view of a preferred embodiment of a field emission display (FED) 100, in accordance with the invention. As illustrated in FIG. 1, FED 100 includes a cathode plate 110 and an anode plate 120. Cathode plate 110 includes a substrate 101, which can be made from glass, silicon, and the like. A cathode 102 is disposed upon substrate 101. Cathode 102 is connected to a first voltage source (not shown). A dielectric layer 103 is disposed upon cathode 102, and further defines an emitter well 104.

An electron emitter structure 105 is disposed within emitter well 104. In the embodiment of FIG. 1, electron emitter structure 105 is a Spindt tip emitter, having a tip 108, and made of a molybdenum material 106.

The display device described herein is directed to a field emission display device having a triode configuration and employing Spindt tip emitter structures. However, the scope of the invention is not intended to be limited to field emission display devices, to devices having a triode configuration, or to devices having Spindt tip emitter structures. In general, the invention can be embodied by a display device that employs an electron source and a cathodoluminescent phosphor for generating the display image. For example, the invention can be embodied by a cathode ray tube display device. Also, in a field emission display device, the electron emitter structure can be a structure other than a Spindt tip, such as an edge emitter, wedge emitter, or surface conduction emitter.

As illustrated in FIG. 1, cathode plate 110 further includes a gate extraction electrode 107, which is disposed on dielectric layer 103 and is connected to a second voltage source 132. Application of selected potentials to cathode 102 and gate extraction electrode 107 can cause electron emitter structure 105 to emit an emission current 136.

Anode plate 120 is disposed to receive emission current 136. In the preferred embodiment of FIG. 1, anode plate 120 is spaced apart from cathode plate 110 by a dielectric spacer 131 to define an interspace region 130. The invention is useful for eliminating or reducing the amount of carbonaceous residues at the surfaces of dielectric spacer 131, as contrasted with prior art FED's that are made using organic dispersants to form the phosphors. In this manner, it is believed that the problem of failure of the spacer structures can be eliminated.

As further illustrated in FIG. 1, anode plate 120 includes a transparent substrate 122 made from a solid, transparent material, such as a glass. An anode 124 is disposed on transparent substrate 122 and is preferably made from a transparent, conductive material, such as indium tin oxide. Anode 124 is connected to a third voltage source 134.

A phosphor 126 is disposed upon anode 124. Phosphor 126 is cathodoluminescent and emits light upon activation by electrons from emission current 136. During the operation of FED 100, a potential is applied to anode 124 for attracting emission current 36 toward phosphor 126.

Figure 2:
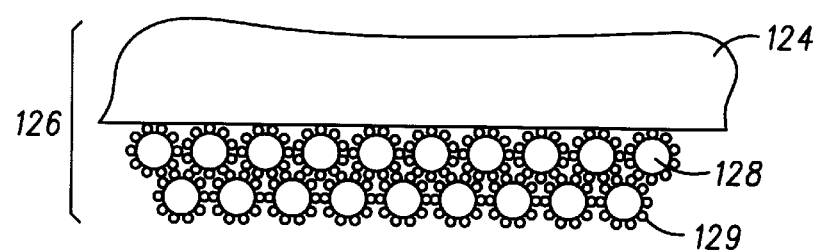
FIG. 2 is a greatly enlarged, partial view illustrating the phosphor of FIG. 1.

FIG. 2 is a greatly enlarged, partial view illustrating phosphor 126 of FIG. 1. In accordance with the invention, phosphor 126 includes a plurality of cathodoluminescent particles 128 and a plurality of non-cathodoluminescent inorganic particles 129, which are interspersed among cathodoluminescent particles 128. Further, non-cathodoluminescent inorganic particles 129 are characterized by a particle size. Cathodoluminescent particles 128 and non-cathodoluminescent inorganic particles 129 together define a particulate component of phosphor 126.

In the preferred embodiment of FIG. 2, phosphor 126 contains only cathodoluminescent particles 128 and non-cathodoluminescent inorganic particles 129. However, the invention can be embodied by a phosphor having components in addition to this particulate component, such as an inorganic binder.

The particulate component of phosphor 126 is characterized by a dry weight % of non-cathodoluminescent inorganic particles 129. In accordance with the invention, the particle size of non-cathodoluminescent inorganic particles 129 and the dry weight % of non-cathodoluminescent inorganic particles are selected to promote de-agglomeration in a phosphor paste used to fabricate phosphor 126.

Preferably, the dry weight % of non-cathodoluminescent inorganic particles 129 is within a range of about 1–3 dry weight %, and, therefore, the dry weight % of cathodoluminescent particles 128 is preferably within a range of about 97–99 dry weight %. Most preferably, the dry weight % of non-cathodoluminescent inorganic particles 129 is equal to about 1 dry weight %.

Preferably, cathodoluminescent particles 128 are made from a cathodoluminescent material selected from the group consisting of $Y_2SiO_5$:Ce, $Y_2O_3$:Eu, and $Y_2SiO_5$:Tb. Preferably, non-cathodoluminescent inorganic particles 129 are made from $Al_2O_3$. It is believed that, due to the relatively high surface area per unit mass (30–60 $m^2$/gram) of the $Al_2O_3$ particles, they can scatter light well, thereby providing light-scattering particles within phosphor 126. It is believed that the presence of light-scattering particles within phosphor 126 results in improved uniformity of the brightness of FED 100.

Preferably, cathodoluminescent particles 128 have a mean particle diameter within a range of 1 to 44 micrometers, and non-cathodoluminescent inorganic particles 129 preferably have a mean particle diameter within a range of 5 nm to 50 nm. Most preferably, non-cathodoluminescent inorganic particles 129 have a mean particle diameter within a range of 10 nm to 40 nm.

The invention is also embodied by a phosphor in which the non-cathodoluminescent inorganic particles are made from an electrically conductive material. In this embodiment, the non-cathodoluminescent inorganic particles are preferably made from an electrically conductive non-cathodoluminescent inorganic material selected from the group consisting of $SnO_2$, $In_2O_3/SnO_2$ (indium tin oxide), and $Sb_2O_3/SnO_2$ (antimony tin oxide). The electrical conductivity of the non-cathodoluminescent inorganic particles provides the benefit of improved electrical conductivity of the phosphor.

The invention is further embodied by a phosphor in which the non-cathodoluminescent inorganic particles are made from a getter, such as a zeolite. A benefit of this embodiment is that it provides gettering (removal of gaseous contaminants) at the location of the phosphor, which may be a major source of the gaseous contaminants generated during the operation of the FED.

The method of the invention for fabricating phosphor 126 includes the step of adding cathodoluminescent particles 128 and non-cathodoluminescent inorganic particles 129 to a liquid carrier to provide a phosphor paste. As described with reference to FIG. 2, the dry weight % of non-cathodoluminescent inorganic particles 129 and the particle size of non-cathodoluminescent inorganic particles 129 are selected to promote de-agglomeration of cathodoluminescent particles 128 within the phosphor paste. Preferably, the dry weight % of non-cathodoluminescent inorganic particles 129 and the particle size of non-cathodoluminescent inorganic particles 129 are further selected to promote suspension stability of the phosphor paste.

Preferably, the liquid carrier is an aqueous binder solution. Most preferably, the aqueous binder solution is an aqueous polyvinyl alcohol solution having a weight % polyvinyl alcohol within a range of 1–10 weight %.

Preferably, the step of adding cathodoluminescent particles 128 and non-cathodoluminescent inorganic particles 129 to the liquid carrier includes the steps of adding cathodoluminescent particles 128 to the liquid carrier to provide a cathodoluminescent particle solution and thereafter adding non-cathodoluminescent inorganic particles 129 to the cathodoluminescent particle solution. Preferably, the cathodoluminescent particle solution has a volume % of cathodoluminescent particles within a range of 16–35 volume %. As described previously with respect to FIG. 2, the dry weight % of non-cathodoluminescent inorganic particles 129 is preferably within a range of 1–3 dry weight %.

As an example, a phosphor in accordance with the invention was made by first providing cathodoluminescent particles made from $Y_2SiO_5$:Tb, which had a mean particle diameter equal to about 4 microns and providing non-cathodoluminescent inorganic particles made from $Al_2O_3$, which had a mean particle diameter equal to about 20 nm. This particulate component had about 1 dry weight % non-cathodoluminescent inorganic particles and about 99 dry weight % cathodoluminescent particles.

The aqueous polyvinyl alcohol solution had about 7.5 weight % polyvinyl alcohol and about 92.5 weight % water. The cathodoluminescent particles were added to the aqueous polyvinyl alcohol solution to provide a cathodoluminescent particle solution. The cathodoluminescent particle solution had about 16.5 volume % cathodoluminescent particles.

Then, the non-cathodoluminescent inorganic particles were added to the cathodoluminescent particle solution to provide a phosphor paste, which was ultrasonicated for 3 minutes and thereafter rolled for 24 hours.

For comparison purposes, a second paste was made using the steps described with reference to the above example, except that a standard organic dispersant (an ammonium polyacrylate) was substituted for the non-cathodoluminescent inorganic particles of the invention. Each phosphor paste was poured into a graduated cylinder, which was capped. To compare the suspension stability of the phosphor pastes, the degree of separation of each column of phosphor paste was measured as a function of time.

The degree of separation is the percentage of the total height of the column of phosphor paste, which is attributable to the height of the supernatant liquid. After approximately 500 hours, the degree of separation of the first paste, which was made in accordance with the method of the invention, was equal to about 2%. In contrast, after the same amount of time, the degree of separation of the second paste, which was made with the organic dispersant, was equal to about 21%. Thus, the phosphor paste made in accordance with the method of the invention exhibited a suspension stability that was superior to that of the paste made with a standard organic dispersant.

To observe the rheological properties of the phosphor paste made in accordance with the method of the invention, a third phosphor paste was made using the steps described with reference to the above example, except that the dispersant was omitted from the paste. The third paste, therefore, contained only cathodoluminescent particles, polyvinyl alcohol, and water.

After the third phosphor paste and the phosphor paste of the invention were made, each was placed in a concentric cylinder rheometer on a scanning sweep run of 0 to 500 to 0 $s^{-1}$. The results of the rheometer readings showed that the non-cathodoluminescent inorganic particles of the invention function as a dispersant by lowering the viscosity. For example, at a shear rate of 500 $s^{-1}$, the viscosity of the phosphor paste made in accordance with the method of the invention was equal to about 0.95 Pa·s, whereas the viscosity of the third phosphor paste at the same shear rate was equal to about 1.6 Pa·s.

For comparison purposes, a first anode plate was made using a phosphor paste made in the manner described above with reference to the example of the method of the invention. After the phosphor paste was made, it was screen printed onto an anode. Thereafter, the anode plate was heated at 450° C. for 60 minutes to remove water and polyvinyl alcohol from the phosphor paste. The luminous efficiency of the first anode plate was measured at 7.35 lumens/watt for an anode voltage equal to 5000 volts and an electron current equal to 10 microamperes.

Ten additional anode plates were made using the same fabrication steps employed to make the first anode plate, except that a phosphor paste having an organic dispersant (the second paste described above with respect to suspension stability) was substituted for the phosphor paste made in accordance with the method of the invention. After the second phosphor paste was made, it was screen printed onto an anode. Thereafter, the anode plate was heated at a temperature of 450° C. for 60 minutes to remove water, polyvinyl alcohol, and ammonium polyacrylate from the second phosphor paste. The average luminous efficiency of these ten additional anode plates was measured at 6.39 lumens/watt for an anode voltage equal to 5000 volts and an electron current equal to 10 microamperes. In addition to exhibiting superior luminous efficiency, the first anode plate exhibited superior brightness uniformity.

In summary, the invention is for a phosphor having a mixture of cathodoluminescent particles and non-cathodoluminescent inorganic particles. The phosphor of the invention can provide improved light-scattering, electrical conductivity, and/or gettering, when compared with prior art phosphors made using organic dispersants. The invention is further for a field emission display, which includes the improved phosphor. A field emission display in accordance with the invention has improved luminous efficiency and improved brightness uniformity. The method of the invention for fabricating a phosphor utilizes non-cathodoluminescent inorganic particles in the phosphor paste. The non-cathodoluminescent inorganic particles function as dispersants and as suspension-stabilizing agents. The non-cathodoluminescent inorganic particles do not leave an organic residue in the phosphor, as do prior art organic dispersants. Furthermore, the method of the invention does not require a step for removing the dispersant.

While we have shown and described specific embodiments of the present invention, further modifications and improvements will occur to those skilled in the art. We desire it to be understood, therefore, that this invention is not limited to the particular forms shown, and we intend in the appended claims to cover all modifications that do not depart from the spirit and scope of this invention.

We claim:

1. A phosphor comprising:

a plurality of cathodoluminescent particles; and a plurality of non-cathodoluminescent inorganic particles interspersed among the plurality of cathodoluminescent particles and characterized by a particle size, the plurality of non-cathodoluminescent inorganic particles comprised of an electrically conductive non-cathodoluminescent inorganic material selected from the group consisting of $SnO_2$, $In_2O_3/SnO_2$, and $Sb_2O_3/SnO_2$, wherein the plurality of cathodoluminescent particles and the plurality of non-cathodoluminescent inorganic particles together define a particulate component, wherein the particulate component is characterized by a dry weight % of non-cathodoluminescent inorganic particles, and wherein the particle size of the plurality of non-cathodoluminescent inorganic particles and the dry weight % of non-cathodoluminescent inorganic particles are selected to promote de-agglomeration in a phosphor paste used to fabricate the phosphor.

2. The phosphor as claimed in claim 1, wherein the dry weight % of non-cathodoluminescent inorganic particles is within a range of about 1–3 dry weight %.

3. The phosphor as claimed in claim 1, wherein the plurality of cathodoluminescent particles comprise a cathodoluminescent material selected from the group consisting of $Y_2SiO_5$:Ce, $Y_2O_3$:Eu, and $Y_2SiO_5$:Tb.

4. The phosphor as claimed in claim 1, wherein the plurality of non-cathodoluminescent inorganic particles comprise $Al_2O_3$.

5. The phosphor as claimed in claim 1, wherein the plurality of non-cathodoluminescent inorganic particles comprise a getter.

6. The phosphor as claimed in claim 1, wherein the plurality of non-cathodoluminescent inorganic particles comprise a plurality of light-scattering particles.

7. A phosphor comprising:
  about 97–99 dry weight % cathodoluminescent particles, wherein the cathodoluminescent particles have a mean particle diameter within a range of 1 to 44 micrometers; and
  about 1–3 dry weight % non-cathodoluminescent inorganic particles wherein the non-cathodoluminescent inorganic particles have a mean particle diameter within a range of 5 nm to 50 nm, the non-cathodoluminescent inorganic particles comprised of an electrically conductive non-cathodoluminescent inorganic material selected from the group consisting of $SnO_2$, $In_2O_3/SnO_2$, and $Sb_2O_3/SnO_2$.

8. The phosphor as claimed in claim 7, wherein the non-cathodoluminescent inorganic particles have a mean particle diameter within a range of 10 nm to 40 nm.

9. The phosphor as claimed in claim 7, wherein the cathodoluminescent particles comprise a cathodoluminescent material selected from the group consisting of $Y_2SiO_5$:Ce, $Y_2O_3$:Eu, and $Y_2SiO_5$:Tb.

10. The phosphor as claimed in claim 7, wherein the non-cathodoluminescent inorganic particles comprise $Al_2O_3$.

11. The phosphor as claimed in claim 7, wherein the non-cathodoluminescent inorganic particles comprise a getter.

12. The phosphor as claimed in claim 7, wherein the non-cathodoluminescent inorganic particles comprise light-scattering particles.

13. A field emission display comprising:
  an electron emitter structure; and
  a phosphor disposed to receive an emission current from the electron emitter structure, wherein the phosphor has about 97–99 dry weight % cathodoluminescent particles and about 1–3 dry weight % non-cathodoluminescent inorganic particles, wherein the cathodoluminescent particles have a mean particle diameter within a range of 1 to 44 micrometers, and wherein the non-cathodoluminescent inorganic particles have a mean particle diameter within a range of 5 nm to 50 nm.

14. The field emission display as claimed in claim 13, wherein the non-cathodoluminescent inorganic particles have a mean particle diameter within a range of 10 nm to 40 nm.

15. A method for fabricating a phosphor comprising the steps of: providing a plurality of cathodoluminescent particles;
  providing a plurality of non-cathodoluminescent inorganic particles characterized by a particle size, wherein the plurality of cathodoluminescent particles and the plurality of non-cathodoluminescent inorganic particles together define a particulate component, and wherein the particulate component is characterized by a dry weight % of non-cathodoluminescent inorganic particles;
  providing a liquid carrier; and
  adding the plurality of cathodoluminescent particles and the plurality of non-cathodoluminescent inorganic particles to the liquid carrier to provide a cathodoluminescent particle solution, wherein the cathodoluminescent particle solution is characterized as a volume % of cathodoluminescent particles within a range of 16–35 volume % and adding the plurality of non-cathodoluminescent inorganic particles to the cathodoluminescent particle solution, wherein the dry weight % of non-cathodoluminescent inorganic particles is within a range of 1–3 dry weight %, wherein the dry weight % of non-cathodoluminescent inorganic particles and the particle size of the plurality of non-cathodoluminescent inorganic particles are selected to promote de-agglomeration of the plurality of cathodoluminescent particles within the cathodoluminescent particle solution.

16. The method for fabricating a phosphor as claimed in 15, wherein the dry weight % of non-cathodoluminescent inorganic particles and the particle size of the plurality of non-cathodoluminescent inorganic particles are further selected to promote suspension stability of the phosphor paste.

17. The method for fabricating a phosphor as claimed in claim 15, wherein the step of providing a liquid carrier comprises the step of providing an aqueous binder solution.

18. The method for fabricating a phosphor as claimed in claim 17, wherein the step of providing an aqueous binder solution comprises the step of providing an aqueous polyvinyl alcohol solution having a weight % polyvinyl alcohol within a range of 1 –10 weight %.

19. The method for fabrication a phosphor as claimed in claim 15, wherein the step of providing a liquid carrier comprises the step of providing an aqueous polyvinyl alcohol solution having a weight % polyvinyl alcohol within a range of 1–10 weight %.

20. The method for fabricating a phosphor as claimed in claim 19, wherein the step of providing an aqueous polyvinyl alcohol comprises the step of providing an aqueous polyvinyl alcohol solution having about 7.5 weight % polyvinyl alcohol, wherein the cathodoluminescent particle solution has about 16.5 volume % cathodoluminescent particles,and wherein the dry weight % of non-cathodoluminescent inorganic particles is equal to about 1 dry weight %.

21. The method for fabricating a phosphor as claimed in claim 15, wherein the step of providing a plurality of cathodoluminescent particles comprises the step of providing a plurality of cathodoluminescent particles having a mean particle diameter within a range of 1 to 44 micrometers, and wherein the step of providing a plurality of non-cathodoluminescent inorganic particles comprises the step of providing a plurality of non-cathodoluminescent inorganic particles having a mean particle diameter within a range of 5 nm to 50 nm.

22. The method for fabricating a phosphor as claimed in claim 21, wherein the step of providing a plurality of non-cathodoluminescent inorganic particles comprises the step of providing a plurality of non-cathodoluminescent inorganic particles having a mean particle diameter within a range of 10 nm to 40 nm.

23. The method for fabricating a phosphor as claimed in claim 15, wherein the step of providing a plurality of cathodoluminescent particles comprises the step of providing a plurality of cathodoluminescent particles made from a cathodoluminescent material selected from the group consisting of $Y_2SiO_5$:Ce, $Y_2O_3$:Eu, and $Y_2SiO_5$:Tb.

24. The method for fabricating a phosphor as claimed in claim 15, wherein the step of providing a plurality of non-cathodoluminescent inorganic particles comprises the step of providing a plurality of particles made from $Al_2O_3$.

25. The method for fabricating a phosphor as claimed in claim 15, wherein the step of providing a plurality of non-cathodoluminescent inorganic particles comprises the step of providing a plurality of non-cathodoluminescent inorganic particles that are electrically conductive.

26. The method for fabricating a phosphor as claimed in claim 25, wherein the step of providing a plurality of non-cathodoluminescent inorganic particles comprises the step of providing a plurality of non-cathodoluminescent inorganic particles mad e from an electrically conductive non-cathodoluminescent inorganic material selected from the group consisting of $SnO_2$, $In_2O_3/SnO_2$, and $Sb_2O_3/SnO_2$.

27. The method for fabricating a phosphor as claimed in claim 15, wherein the step of providing a plurality of non-cathodoluminescent inorganic particles comprises the step of providing a plurality of non-cathodoluminescent inorganic particles made from a getter.

28. The method for fabricating a phosphor as claimed in claims 15, wherein the step of providing a plurality of non-cathodoluminescent inorganic particles comprises the step of providing a plurality of light-scattering particles.

* * * * *